(12) United States Patent
Laing et al.

(10) Patent No.: US 11,613,982 B2
(45) Date of Patent: Mar. 28, 2023

(54) HORIZONTAL WELLBORE SEPARATION SYSTEMS AND METHODS

(71) Applicant: Cleantek Industries Inc., Calgary (CA)

(72) Inventors: Eric Laing, Calgary (CA); Geoff Steele, Calgary (CA); Pawandeep Khaira, Calgary (CA)

(73) Assignee: CLEANTEK INDUSTRIES INC., Calgary (CA)

( * ) Notice: Subject to any disclaimer, the term of this patent is extended or adjusted under 35 U.S.C. 154(b) by 0 days.

(21) Appl. No.: 17/129,681

(22) Filed: Dec. 21, 2020

(65) Prior Publication Data

US 2022/0195859 A1 Jun. 23, 2022

(51) Int. Cl.
| | |
|---|---|
| *E21B 43/38* | (2006.01) |
| *B01D 19/00* | (2006.01) |
| *E21B 33/12* | (2006.01) |
| *E21B 41/00* | (2006.01) |
| *E21B 43/12* | (2006.01) |
| *E21B 43/16* | (2006.01) |
| *E21B 43/40* | (2006.01) |
| *B01F 23/23* | (2022.01) |
| *B01F 23/232* | (2022.01) |
| *B01F 23/00* | (2022.01) |
| *B01F 101/40* | (2022.01) |
| *B01F 101/49* | (2022.01) |

(52) U.S. Cl.
CPC .......... *E21B 43/38* (2013.01); *B01D 19/0042* (2013.01); *B01F 23/2319* (2022.01); *B01F 23/2323* (2022.01); *E21B 33/12* (2013.01); *E21B 41/0078* (2013.01); *E21B 43/122* (2013.01); *E21B 43/128* (2013.01); *E21B 43/16* (2013.01); *E21B 43/40* (2013.01); *B01F 23/024* (2022.01); *B01F 2101/40* (2022.01); *B01F 2101/49* (2022.01)

(58) Field of Classification Search
CPC ...... E21B 43/38; E21B 33/12; E21B 41/0078; E21B 43/122; E21B 43/128; E21B 43/16; E21B 43/40; B01D 19/0042; B01F 23/2319; B01F 23/2323; B01F 23/024; B01F 2101/40; B01F 2101/49
See application file for complete search history.

(56) References Cited

U.S. PATENT DOCUMENTS

2016/0281486 A1* 9/2016 Obrejanu ............... E21B 43/121
2020/0399998 A1* 12/2020 Laing ..................... F04B 23/08

* cited by examiner

*Primary Examiner* — James G Sayre
(74) *Attorney, Agent, or Firm* — Greenblum & Bernstein, P.L.C.

(57) ABSTRACT

A flow management and separation system for a horizontal wellbore having a primary artificial lift device having an intake has (a) a sealed central flowpath from a fluidseeker weighted keel inlet, through a recovery flow tube, a seal bore extension and a dip tube having a pump intake sealing assembly in fluid communication with the lift device intake; and (b) a mixed fluid flow path from a fluidseeker internal bypass passage, through an annulus of at least one slug catcher comprising a perforated shell.

8 Claims, 3 Drawing Sheets

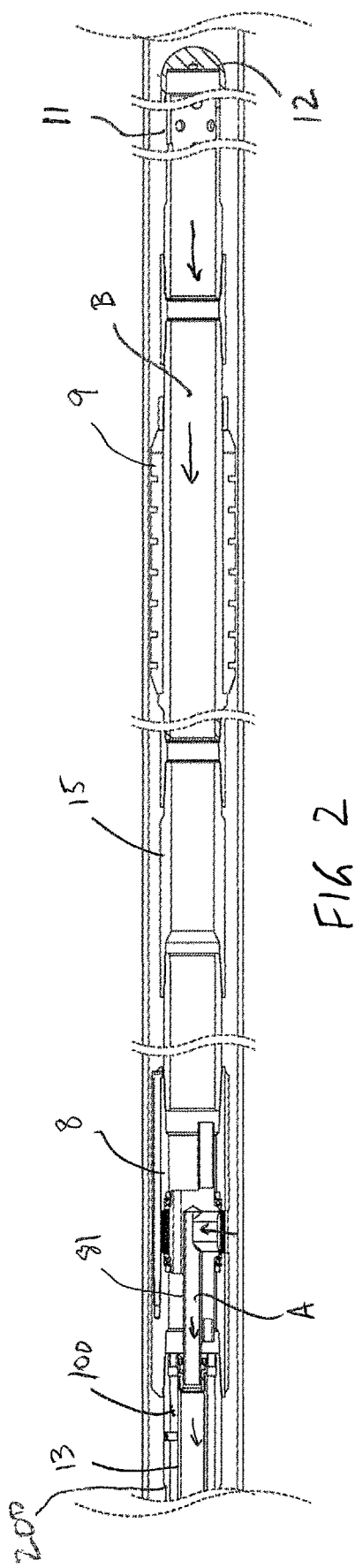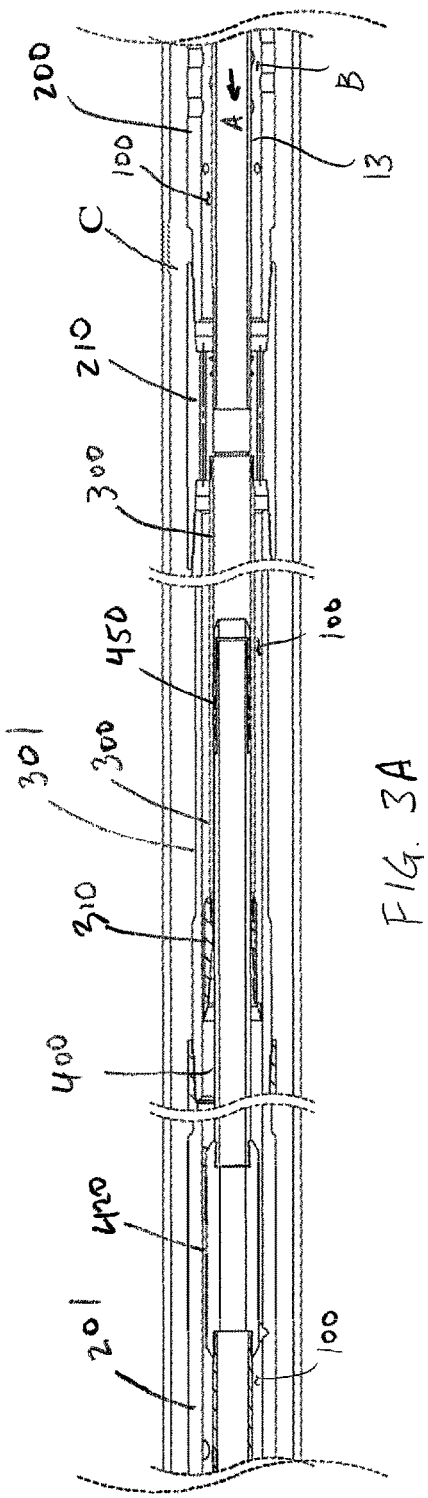

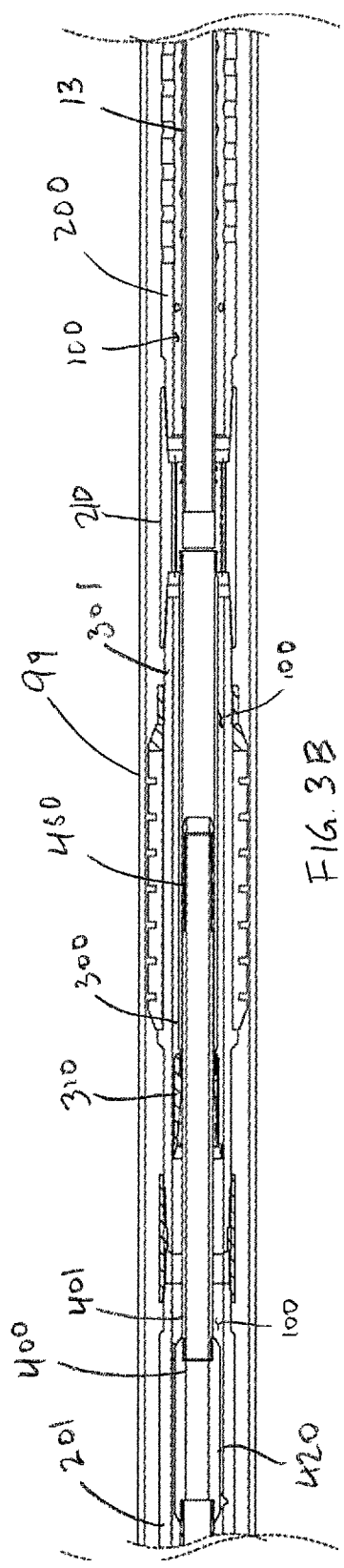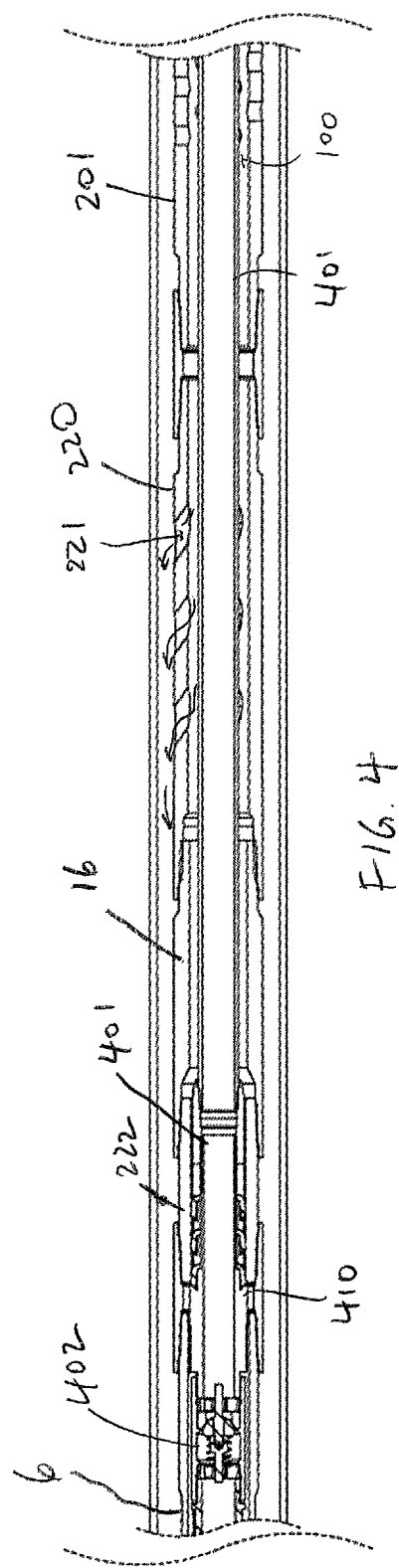

HORIZONTAL WELLBORE SEPARATION SYSTEMS AND METHODS

FIELD OF THE INVENTION

The present invention relates to a well fluid separation system and method for producing fluids from a wellbore having a vertical section, a horizontal section and an intermediate build section.

BACKGROUND

It is well known in the art of oil and gas production to use pumps landed in the deepest point of a vertically oriented wellbore, or any section of a lined, perforated, open hole or fracture stimulated horizontal wellbore, to lift produced liquids from the reservoir to surface. Various mechanical pumps such as rod pumps, progressive cavity pumps, electric submersible pumps or hydraulically actuated pumps are in widespread use in the oil and gas industry.

There are many benefits to a horizontal drilling and completions strategy for completing and producing wellbores. A horizontal wellbore can increase the exposure of the reservoir by creating a hole which follows the reservoir thickness. A typical horizontal wellbore plan also allows for the wellbore trajectory to transversely intersect the natural fracture planes of the reservoir and thereby increase the efficiency of fracture stimulation and proppant placement and therefore total productivity.

The primary advantage of a horizontally oriented wellbore is the exposure of a greater segment of the reservoir to the wellbore using a single vertical parent borehole than is possible using several vertical wellbores drilled into the same reservoir. Using multiple horizontal boreholes exiting from a single vertical wellbore in a multilateral well may increase the advantage. However, in order to maximize this advantage, well performance must be proportional to the exposed length of reservoir in the producing well. As is commonly known in the industry, the relationship of well exposure to well productivity is not directly proportional in horizontally oriented wellbores.

Generally, the production of horizontal wellbores is initially exploited using reservoir energy. The vast majority of horizontal wellbores are now stimulated with horizontal multi-stage fracturing systems to increase the exposure of the reservoir to the horizontal wellbore. However, this stimulation technique only finitely energizes the reservoir, with the pressure returning quickly to the original in-situ reservoir pressure. If the reservoir drive is insufficient or quickly dwindles, production from the horizontal segment of the wellbore is drawn down utilizing a single pump inlet, typically landed at or near the heel of the horizontal wellbore. Alternatively, other conventionally known lift solutions such as plunger lift and gas lift are used to manage the back pressure on the formation through the vertical and build section of the wellbore. Services such as jet pumps may be used intermittently to unload or clean out the horizontal wellbore section.

Conventional artificial lift means for producing a horizontal well do not influence the reservoir much past the heel of the wellbore, which results in heel-preferential depletion, where drawdown is localized to the region near the heel.

The drawdown pressure is also limited to the theoretical vapor pressure of the fluid being pumped. A producing oil well, either horizontal or vertical, transitions through its bubble point during its producing life. When this occurs, gas escapes from solution and there exists at least oil and gas phases in the reservoir, resulting in a gas cap drive. The efficient production of these types of reservoirs may be accomplished by carefully managing the depletion of the gas cap drive, which may be monitored by the produced gas/liquid ratios. In a traditional free-flowing gas cap drive well, the fluids will be mobilized by the gas drive and follow the path of least resistance in the journey towards the surface. Again, this results in a disproportionate production of the reservoir in the vicinity of the heel of the wellbore. The onset of premature depletion at the heel is exacerbated by the single drawdown location in the wellbore located near the heel. This production regime is present throughout the producing life until the heel becomes depleted and the gas cap drive breaks through near the heel, resulting in elevated gas/liquid ratios. This can result in gas locking and fluid pounding, overheating, fluctuating torques, increased slippage (plunger/barrel or rotor/stator) and lower pumping efficiency, which can lead to significant damage to the vertical pumping solution. Eventually the gas drive will deplete, leaving unproduced fluid (reserves) in the reservoir space, leading to low recovery factors and stranded oil in the reservoir.

It is well known that pumping systems landed at or near the heel of the horizontal portion of a wellbore can suffer from poor efficiencies. The poor efficiencies manifest in the build section of the wellbore and are the result of the disorganized nature of the flow as the wellbore transitions from substantially horizontal to substantially vertical. This disorganized flow condition results in various phases being present in the vicinity of the pump system intake for varying lengths of time, resulting in the pump ingesting different phases over an extended period of time. This condition is related to the industry practice of positioning the intake for any lift system above the perforations in the horizontal portion of the wellbore. A pumping system positioned some vertical distance above the producing perforations will have a finite operating life. The dynamic fluid level in the wellbore will eventually drop below the intake to the pumping system, where the pump will ingest only gas from the annulus, leading to very poor overall pumping efficiency.

The complexity of such flow regimes within the wellbore can present falsely as a fluid level in the annulus, leading the well operator to believe that the pumping system has malfunctioned. In fact, as the flow transits the build portion of the wellbore and the various phases exchange dominance, the flow at each of the sections (nodes) transiting the measured wellbore length will appear very different. This can manifest, for example, as "pockets" of gas traveling along the measured wellbore length and, despite the presence of a "static" fluid level above, will negatively impact the pumping system performance. This poor performance may vary in duration and be influenced by a variety of criteria including, but not limited to, gas to liquid ratios, wellbore geometry, wellbore pressure, inclination and azimuth of the wellbore horizontal and build sections.

There remains a need for a separation system to allow for efficient removal liquids from wellbores of different geometries, including horizontal segments, which addresses hydraulic issues that pertain to these types of wells.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

In general terms, the present invention comprises a system and method for fluid flow management integral to the tubing and located downhole of a vertical lift pump.

Embodiments of the system and method of the present invention may be applied in conjunction with unconventional or enhanced oil recovery techniques, such as steam-assisted gravity drainage, miscible flood, steam (continuous or cyclic), gas or water injection. Embodiments of the system and method of the present invention may also be used in off-shore situations, including where the well head is located on the sea bed.

Phase separation has been previously addressed conventionally with oil and gas separators landed above the transitional build section of the wellbore to manage separation before entering the vertical lift solution, which is conventionally disposed above the build section. The present invention generally relates to a purely horizontal wellbore separation system for use in the applications downhole of the build section, where liquid and gas phases are separated before entering the build section of the wellbore.

In one aspect, the invention may comprise a flow management and separation system for a wellbore having a horizontal section, vertical section and intermediate build section, a production tubing and a primary artificial lift device having an intake and an outlet into the production tubing. An annulus is defined between the production tubing and the wellbore, which may be cased or lined. The system may comprise:

(a) an intake and a central flow passage, to receive produced fluids from the reservoir;

(b) a distal wavebreaker having an increased outside diameter presenting a narrowed annular cross-section, through which the central flow passage passes, and a fluidseeker comprising an axially rotatable inlet extension having a weighted keel inlet in fluid communication with a flow recovery tube, and an internal bypass passage in fluid communication with the central flow passage; and (c) a first slug catcher assembly comprising a perforated shell disposed around the flow recovery tube and connected to the fluidseeker bypass passage, having a length and volume configured to capture a slug volume; and (d) a sealing sub comprising an internal seal bore extension and a seal bore entry guide, configured to receive a bottom end of a pump intake dip tube, wherein the seal bore extension is connected to the flow recovery tube, the sealing sub defining a bypass passage connected to the first slug catcher;

(e) a second slug catcher comprising a perforated shell disposed around the dip tube and connected at its distal end to the sealing sub bypass, having a length and volume configured to capture a slug volume; and (f) a pump seating nipple disposed proximally to the second slug catcher, and configured to receive a pump.

The slug catchers are configured to have an annular space between the outside diameter of the recovery flow tube and the inside diameter of the slug catcher, and sufficient length for liquid/gas separation, with reduced flow velocity, which increases retention time.

The slug catchers are thus configured to facilitate liquid/gas separation during normal operation, where gas escapes to the annulus and liquid drains out into the annulus, while also having sufficient volume to catch and de-energize slugs which are travelling in the annular space surrounding the flow recovery tube and slug catcher. In either case, mixed fluid flow has sufficient retention time in and around the slug catchers to effectively allow gas/liquid separation.

In another aspect, the invention may comprise a flow management and separation system for a horizontal wellbore having a primary artificial lift device having an intake, the system comprising:

(a) a sealed central flowpath from a fluidseeker weighted keel inlet, through a recovery flow tube, a seal bore extension and a dip tube having a pump intake sealing assembly in fluid communication with the lift device intake; and (b) a mixed fluid flow path from a fluidseeker internal bypass passage, through an annulus of at least one slug catcher comprising a perforated shell.

In some embodiments, the system may comprise a momentum sub disposed on the proximal end of the fluid flow management system, configured to conserve the momentum of gas flow by having at least one outlet having a narrow angle to direction of fluid flow, and which is preferably on the upper side of the momentum sub.

A fluid flow management system may be deployed below any artificial lift system well known in the art, or otherwise, including but not limited to: diaphragm pumps, electric submersible pumps, hydraulic submersible pumps, jet pumps, pneumatic drive pumps, gas lift, chamber lift, plunger lift, gear pump, progressive cavity pump, vane pump or any combination thereof.

In some embodiments, the fluid flow management system may be deployed into a wellbore and provide fluid conditioning for fluids entering the intake of an insert type high angle reciprocating pump landed immediately adjacent to the system on the proximal end.

In some embodiments, the system comprises two or more slug catcher assemblies, and the junction between two adjacent slug catchers comprises an internal bypass collar which collar facilitates the connection of an internal seal bore extension to receive the pump intake seal assembly.

In some embodiments, the system comprises a direct, sealed connection between the recovery flow tube which passes through the flow management system and the intake to the vertical lift pump, which is deployed with the pump and landed into the seal sub, above the first slug catcher.

In some embodiments, the seal bore assembly is disposed concentrically within a seal sub or a wavebreaker, and is equipped with a fluted or perforated outer body and internal beveled face to properly centralize the seal bore, permit gas/fluid bypass and properly guide the dip tube seal assembly into the seal bore prior to landing the high angle insert pump within a pump seating nipple.

In some embodiments, the high angle reciprocating pump may be equipped with a flow tube extension below the pump which flow tube extension is guided and centralized within the seal sub and slidingly and sealingly engages the polished bore of the fixed seal receptacle. Engaging these seals serves to directly connect the pump intake with the discharge end of the fluidseeker assembly.

In some embodiments, the system may comprise at least one shear sub, which provides an upward strain shear release mechanism. Disconnection by shearing the shear sub may initiate a fishing operation, for example to recover or retrieve downhole components.

In other embodiments, the fluid flow management system may be deployed distally to an electric submersible progressive cavity pump to provide flow conditioning for the fluids entering the intake of the electric submersible pump.

In one embodiment, the fluid flow management system may be deployed with tubing adjacent to and below the system wherein the tubing is equipped with pressure and/or temperature gauges and memory packs or surface read out data acquisition equipment. The purpose of this sensor string being to monitor conditions along the length of the wellbore and acquire data. The acquired data may permit assessing the contribution of fracture points and providing insight into the potential location of and potential productivity improvements associated with locating horizontal pumps in strategic positions along the horizontal length spanning from the heel to the toe of the wellbore.

In another aspect, the invention may comprise a method of producing a well having a vertical, build and horizontal sections, and comprising a production tubing and a lining, casing or reservoir face defining an annulus, the method comprising the steps of:

(a) landing a primary artificial lift system in the build section or a heel portion of the horizontal section, into a sealed connection of a fluid flow management system configured to calm annular mixed phase flow, provide retention time to encourage liquid dropout to a lower section of the annulus, and comprising a rotatable gravity directed inlet extension oriented in the lower section of the annulus, wherein the inlet extension is connected to an intake for the primary artificial lift system; and (b) de-energizing liquids slugs which are transiting an annular ring space in and around the flow management system, serving to calm the flow, incorporate additional length and therefore retention time in the system; and (c) lift fluids through the inlet extension with the artificial lift system.

The method allows the maintenance of momentum of the wellbore fluids throughout the system to permit escape of free gas from the flow management system.

In some embodiments, the method may further comprise the step of collecting wellbore data from downhole locations and processing the data to (a) control operation of the primary artificial lift and/or the fluid flow management system, (b) plan or configure a horizontal pumping system, and/or (c) plan a stimulation fracturing scheme.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 2 depicts a schematic view of the distal end of the flow management system with the perforated intake, wavebreaker, spacer joint, fluidseeker and a first slug catcher.

FIG. 3A depicts a schematic view of the flow management section adjacent to the distal end section which shows the proximal end of the first slug catcher equipped proximally with the internal bypass collar, with internal connections distally to the first slug catcher and proximally to the seal bore receptacle assembly with the landed and sealed dip tube assembly.

FIG. 3B depicts an alternative embodiment of the system comprising a second wavebreaker disposed above the fluidseeker.

FIG. 4 depicts a schematic view of the proximal flow management section containing the proximal end of the second slug catcher, momentum sub, pump seating nipple and internally and concentrically disposed dip tube and bottom anchor pump and seating cup mandrel assembly.

DETAILED DESCRIPTION OF PREFERRED EMBODIMENTS

Figure 1:
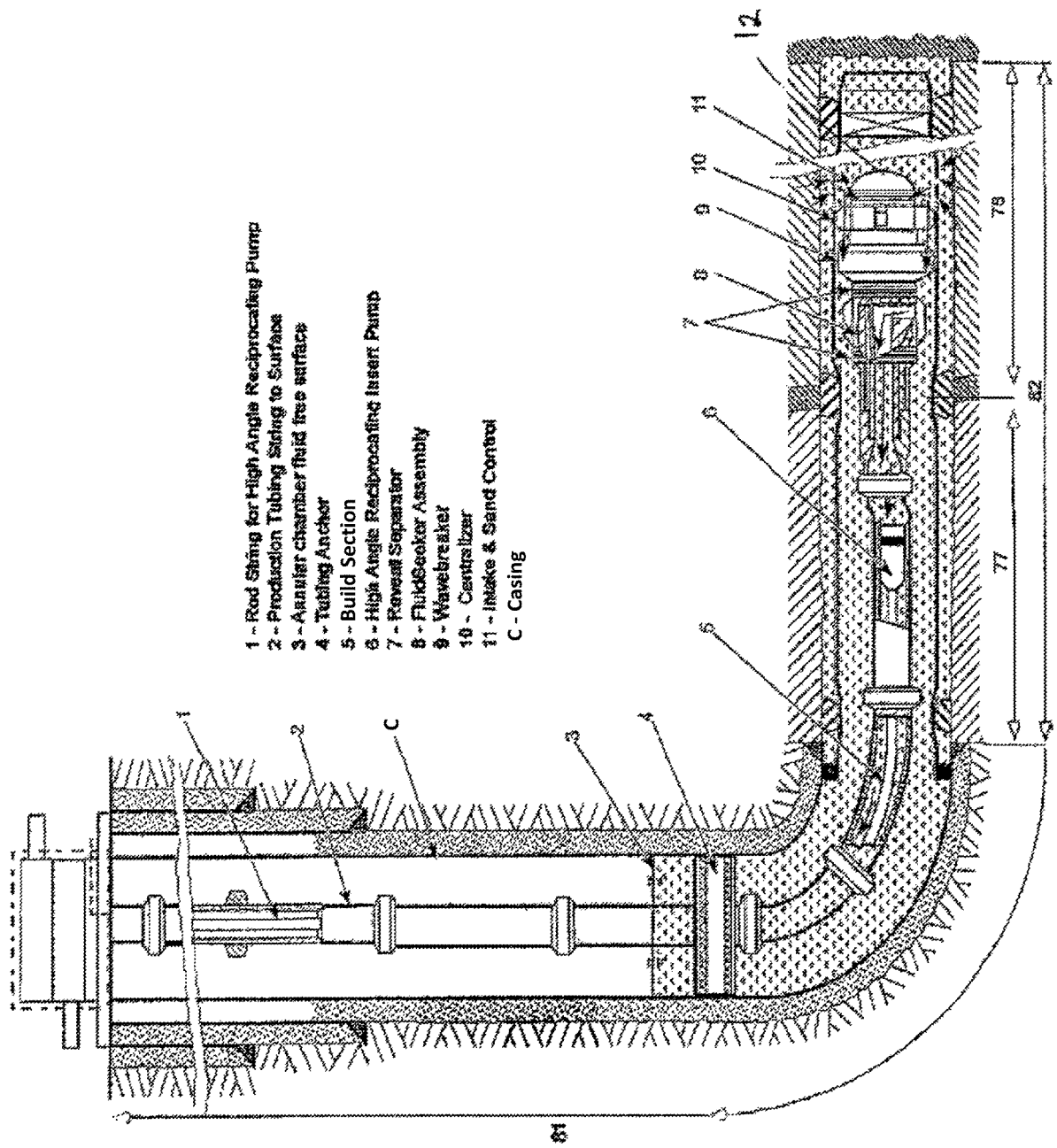
FIG. 1 shows a schematic representation of a wellbore having a vertical section, transitional (build) section, and a horizontal section. This figure shows a high angle rod pump landed horizontally just beyond the build section, and the fluid flow management system in the horizontal wellbore, distally adjacent to the pump.

In general terms, the invention comprises a fluid flow management system which enhances gas/liquid separation and production to the surface, and relates to methods and systems for producing fluids from wellbores having a vertical section, a horizontal section, and an intermediate build section, as schematically depicted in FIG. 1.

As used herein, the terms "distal" or "below" and "proximal" or "above" are used to describe the relative positioning of elements, where the distal end of components is farther downhole, away from surface components, while the proximal end is uphole, closer to the surface components, regardless of vertical or horizontal orientation.

As used herein, the term "fluid" is used in its conventional sense and comprises gases and liquids.

The physics of production flow in horizontal section is different from the vertical section. The vertical section of the wellbore requires relatively higher horsepower because of the need to lift liquids up against gravity. The horizontal length and build section of the wellbore presents a horizontal fluid transportation problem, with much lower head and nominal horsepower requirements. In general, the fluid flow management system described herein is configured to create calm (non-turbulent) fluid conditions in the heel portion of the wellbore. This calm flow is a consequence of the gravity separation and retention time permitted to continue in isolation in the heel segment and through the transitional section of the wellbore.

Fluid slugging in this region can be prevalent, resulting in a downgraded pumping system performance. Embodiments of the invention may be employed to mitigate against fluid slugging and disorganized fluid flow. This fluid flow management system comprises components that work in concert to organize fluid flow leading up to the transitional (build) section. Slugging in the annulus may be mitigated by the action of a wavebreaker, which serves to de-energize the flow from the reservoir and direct fluid into the main intake (11). The wavebreaker also serves to enhance liquid hold up uphole from the wavebreaker, in the substantially horizontal portion of the wellbore, which may improve submergence of the fluidseeker.

Generally, fluid flow management systems described herein may be combined with any vertical artificial lift solution, including without limitation a reciprocating rod pump, a diaphragm pump, an electric submersible pump, a hydraulic submersible pump, a jet pump, a pneumatic drive pump, a gas lift pump, a gear pump, a progressive cavity pump, a vane pump or combinations thereof.

In one embodiment, the vertical lift pump is a high angle reciprocating rod pump, which operates in a conventional manner, but may include adaptations which permit its use at more horizontal orientations, and even completely horizontal. In one embodiment, the high-angle rod pump may be landed just below the build section, in the heel of the horizontal section, adjacent to, and above the fluid flow management system. Examples of such a pump are described in co-owned U.S. patent application Ser. No. 15/321,140 entitled "Rod Pump System", the entire contents of which are incorporated herein by reference, where permitted.

In some embodiments, the invention comprises a fluid flow management system for treating a multi-phase fluid stream in a horizontal wellbore, to produce a liquid stream for a pump intake, which works in conjunction with (a) an intake section with optional sand control media; (b) a distal annular slug mitigation device (referred to herein as a wavebreaker); and (c) a gravity assisted intake (referred to herein as a fluidseeker) which self-orients downwards, to increase the probability of the intake being immersed in a liquid. The multi-phase fluid stream enters the intake section, bypasses the fluidseeker, and enters the fluid flow management system described below. Liquids which drop out into the annulus are retained at the distal end by the wavebreaker, and picked up by the fluidseeker intake. Gases accumulate and continue to flow uphole in the annulus.

As shown schematically in FIG. 1, the components in the vertical section are conventional, including a conventional rod string (1) which reciprocates within the production tubing (2), which is concentrically placed in the well casing, creating an annular space between the tubing (2) and the casing in the vertical section. A tubing anchor (4) places the tubing (2) in the wellbore in tension, however does not isolate the annular space above and below the tubing anchor (4). Thus any fluid produced in the annular space is free to migrate upwards past the tubing anchor (4).

The rod string (1) continues in the build section (5) and actuates the rod pump (6), which in this embodiment is landed in the horizontal section production tubing (2). A perforated liner may hang from the casing and extend through the horizontal section of the wellbore. The liner and/or casing may be cemented and/or perforated. The liner and/or casing may incorporate fracture stimulation sleeves or other devices to direct fracture stimulation treatment fluids and proppants. Alternatively, the wellbore completion may be of an open hole structure.

The fluid flow management system is positioned proximally to the fluidseeker (8), which is proximal to the wavebreaker (9). A centralizer may be provided which positions the horizontal production assembly within the liner, and an intake (11) which may comprise sand control, and is equipped with a bull plug (12) to direct reservoir fluids through the primary system intake/sand control assembly (11). Mixed phase fluids (B) from the reservoir enter the system through the system intake (11), pass through the wavebreaker (9) and the fluidseeker (8) and are managed in the flow management system which connects to the artificial lift pump (6).

The fluidseeker (8) defines an internal passage for liquids which leads to a flow recovery tube (13) and eventually to the vertical pump intake. The liquid intake is defined in a weighted keel rotating extension, which orients the intake downward, thus permitting pickup of liquids which settle in a lower portion of the annular space. The liquid accumulates as a result of the retention and separation of phases in the annulus and in the flow management system.

The wavebreaker (9) serves to calm the fluid or reduce velocity of the fluid in the wellbore. Additionally, the wavebreaker (9) serves to enhance liquid hold up in the region of the wellbore which houses the fluid flow management system. This liquid hold-up creates fluid submergence at the portion of the fluid flow management system which contains the fluidseeker. This submergence directly feeds the intake to the artificial lift pump by way of the weighted keel assembly internal to the fluidseeker (8) flanged outer body. The wavebreaker defines an internal central fluid passage which is in fluid communication with the intake (11) and the fluidseeker (8). The exterior of the wavebreaker (9) is configured to restrict fluid flowing around the wavebreaker.

Embodiments of the fluidseeker and wavebreaker are described in co-pending U.S. application Ser. No. 16/978,484, entitled Horizontal Wellbore Separation System and Method, the entire contents of which are incorporated herein by reference.

FIGS. 2, 3A, 3B and 4 show an exemplary schematic configuration of fluid flow management system of the present invention, which is configured to manage the multi-phase flow passage through the horizontal wellbore. Fluids from the reservoir enter the intake (11) on the downhole distal end of the system. Fluid slugging movement in the horizontal wellbore annulus in the region of the intake is dissipated by the wavebreaker (9), while gas already in a free state in this region is permitted to travel around the wavebreaker (9) and continue to flow in the annulus. Liquids and mixed flow (B) are then encouraged to enter a central flow passage by way of the perforated/screened intake (11). The mixed-phase flow passes through the center of the wavebreaker (9), through fluidseeker (8) bypass passages, and into the annular space (100) surrounding a recovery flow tube (13).

This annular space (100) provides a flowpath for the mixed phase flow (B), which may be of higher velocity due to the reduced cross-sectional area. The mixed phase is retained in this annular space to allow for phase separation under the influence of gravity. Sufficient retention length may be designed into the system above the fluidseeker (8) to induce the desired calmness in the flow and increase surface area of the resident fluid to encourage phase separation. Free and evolved gas escape through perforations. Liquids drain out and accumulate on the bottom of the horizontal wellbore in the vicinity of the fluidseeker inlet. As the fluidseeker inlet orients itself downwards, it is thus submerged in liquid. Consequently, it can supply high quality of liquid via the recovery flow tube and ultimately the pumping system intake.

The fluid flow management system comprises at least one slug catcher (200) configured to capture and de-energize slugs travelling in the annular space surrounding the slug catcher (C). Preferably, the system comprises first and second slug catchers (200, 201), which may be separated by an internal bypass collar (210) which permits conservation of momentum of the flow allowing free gas to transit horizontally through the annulus, while maintaining calmness and retention time in the annulus (C). This retention time enhances the collection of liquids which are picked up by the weighted keel intake of the fluidseeker assembly and feed into the pump intake tube.

The purpose of the slug catcher is to capture a liquid slug in the annulus, reduce its velocity and permit gas to pass around the slug. The slug catcher comprises a perforated tube concentrically disposed around the flow recovery tube (13). The perforations may constitute a single pattern or combinations of patterns as desired to create the desired flow conditions in the annulus. The number and size of the perforations may be engineered to optimize performance of the slug catcher. Gases and liquids may escape or drain from the slug catcher through the perforations.

One or both slug catchers (200, 201) preferably have a designed length and volume and perforation configuration sufficient to capture a liquid slug volume. Slug volumes may be empirically measured, or estimated using known techniques.

FIG. 2 depicts a schematic view of the distal end of the horizontal production tubing, with the perforated intake (11), wavebreaker (9), spacer joint, fluid seeker (8) and the distal end of a first slug catcher (200). An optional shear sub (15) provides an ability to separate the system from above the wavebreaker (9).

FIG. 3A depicts a schematic view of the flow management section adjacent to the distal end section which shows the proximal end of the first slug catcher (200) connected to an internal bypass collar (210). The internal bypass collar is connected to a seal sub (301) and flow path A passes through the collar (210) to an internal connection with a seal bore extension (300), which is a receptacle assembly that engages with a landed and sealed dip tube assembly (400). The dip tube assembly (400) may comprise a centralizer (420). A seal (450) is created at the lower end of the dip tube assembly (400), within the seal bore receptacle assembly (300).

In an alternative embodiment, as shown in FIG. 3B, an additional wavebreaker (99) may be provided which may be disposed between the first and second slug catchers (200, 201). The wavebreaker may be disposed around the circumference of the seal sub (301).

Concentrically disposed within the sealing sub (301) is the internal seal bore extension (300). This seal bore extension is threadingly and sealingly connected to the internal bypass collar (210) and is centralised by way of a seal bore entry guide (310). The entry guide (310) is fluted and/or perforated to allow mixed phase flow around the guide (310). This assembly permits the seal nipple assembly seal (450) appended to the bottom anchor assembly and dip tube (401) of the artificial lift pump to slidingly and sealingly engage within the seal bore extension (300). Once stabbed in, the pump intake will be directly connected to the recovery flow tube (13) of the weighted keel fluidseeker (8) assembly. Such a seal assembly will nominally land at the center of the length of the seal bore extension in order to permit the seating cup mandrel assembly (410) and artificial lift pump (6) to be landed into the pump seating nipple (222).

FIG. 4 depicts a schematic view of the flow management section immediately below the rod pump (6), which shows the proximal end of the second slug catcher (201), a momentum sub (220), a pump seating nipple (222), and the internally and concentrically disposed dip tube (401). The pump (6) may be landed into pump seating nipple (222) which is attached to the bottom anchor pump and seating cup mandrel assembly (410). The pump standing valve (402) is part of a rod pump assembly. In alternative embodiments, the dip tube (401) may provide the intake for any other suitable artificial lift device.

In some embodiments, a shear sub (16) provides an ability to separate the system from above the second slug catcher (201) or momentum sub (220).

In some embodiments the proximal end of the downstream slug catcher (201) may be equipped with a momentum sub (220). The fluid flow through the flow management system which has not escaped from any downhole component, which should be primarily gas, exits the momentum sub. The momentum sub defines ports (221) oriented at a shallow angle, for example about 45°, with respect to the direction of flow (center line of the part) in order to conserve the momentum of flow through the system from the mixed flow annulus (100) into the casing annulus. In a preferred embodiment, the ports (221) may be sized to provide little resistance to gas flow, and may be larger than the perforations in a slug catcher. The ports are preferably positioned on an upper side or top of the momentum sub, as shown in FIG. 4, to facilitate gas to rise and escape through the ports. The side opposite the ports (221) may be closed.

Accordingly, the flow management system may be conceived as being a separation vessel having a defined volume, uphole from the fluidseeker, which is perforated to allow liquids to drain out and gas to escape into the annulus. Liquids which have been picked up through the fluidseeker keel intake are passed through the center of the flow management system directly to the pump intake through a sealed passage made up of the recovery tube (13), seal bore extension, and the dip tube (401). The mixed phase flow which bypasses the fluidseeker is managed in the slug catchers (200, 201) to encourage further phase separation where liquids drain towards the fluidseeker inlet, while gas enter the annulus towards the casing annulus. Liquid slugs which form in the annulus around the flow management system are caught by the slug catchers.

In the casing annulus, gas passes through or around the tubing anchor (4) and is permitted to rise towards the surface. Any liquids retained in the gas may continue to condense or coalesce, and fall downhole by way of gravity separation and by virtue of the retention time in the annulus.

Aspects of the Invention

In view of the description above, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1. A flow management and separation system for a wellbore having a horizontal section, vertical section and intermediate build section, a production tubing and a primary artificial lift device having an intake and an outlet into the production tubing, the system comprising:

(a) an intake and a central flow passage, to receive produced fluids from the reservoir;

(b) a distal wavebreaker presenting a narrowed annular cross-section, through which the central flow passage passes, and a fluidseeker comprising an axially rotatable inlet extension having a weighted keel inlet in fluid communication with a flow recovery tube, and an internal bypass passage in fluid communication with the central flow passage; and (c) a first slug catcher assembly comprising a perforated shell disposed around the flow recovery tube and connected to the fluidseeker bypass passage, having a perforation configuration, length and volume configured to capture a slug volume and slow its advance; and (d) a sealing sub comprising an internal seal bore extension and a seal bore entry guide, configured to receive a bottom end of a pump intake dip tube, wherein the seal bore extension is connected to the flow recovery tube, the sealing sub defining a bypass passage connected to the first slug catcher;

(e) a second slug catcher comprising a perforated shell disposed around the dip tube and connected at its distal end to the sealing sub bypass; and (f) a pump seating nipple disposed proximally to the second slug catcher, and configured to receive a pump.

Aspect 2. The system of aspect 1, further comprising a second wavebreaker disposed between the first and second slug catchers.

Aspect 3. The system of aspect 1 or 2, further comprising a momentum sub comprising a shell having perforations through an upper surface, which perforations are preferably angled in the uphole direction.

Aspect 4. The system of any one of aspects 1, 2 or 3, wherein one or both slug catchers have define a volume protruding radially inward which is equal to or greater than a slug volume which passes around the slug catcher.

Aspect 5. The system of any one of aspects 1-4, further comprising a shear sub disposed proximal to the distal wavebreaker.

Aspect 6. The system of aspect 1-5, further comprising a shear sub disposed proximal to the second slug catcher.

Aspect 7. The system of aspect 3, 4 or 5, wherein the system comprises a shear sub disposed proximal to the momentum sub.

Aspect 8. The system of any one of aspects 1-7, which is landed in a substantially horizontal portion of the wellbore, preferably inclined between about 5° to about 1° toe down.

Aspect 9. A flow management and separation system for a horizontal wellbore having a primary artificial lift device having an intake, the system comprising:
(c) a sealed central flowpath from a fluidseeker weighted keel inlet, through a recovery flow tube, a seal bore extension and a dip tube having a pump intake sealing assembly in fluid communication with the lift device intake; and
(d) a mixed fluid flow path from a fluidseeker internal bypass passage, through an annulus of at least one slug catcher comprising a perforated shell.

Aspect 10. The system of aspect 9, comprising a seal sub comprising the seal bore extension and a seal bore entry guide, configured to receive the dip tube and pump intake sealing assembly, wherein the seal sub defines an annulus for the mixed fluid flow path.

Aspect 11. The system of aspect 10 further comprising a second slug catcher disposed proximal to the seal sub, defining an annulus for the mixed fluid flow path.

Aspect 12. The system of aspect 9, 10 or 11, further comprising a momentum sub comprising a shell having perforations through an upper surface, which perforations are preferably angled in the uphole direction.

Aspect 13. The system of aspect 11, further comprising a shear sub disposed proximal to the the second slug catcher.

Aspect 14. The system of aspect 12, further comprising a shear sub disposed proximal to the momentum sub.

Aspect 15. A fluid flow management system as described herein, comprising any combination of features and elements described above.

INTERPRETATION

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated. To the extent that the following description is of a specific embodiment or a particular use of the invention, it is intended to be illustrative only, and not limiting of the claimed invention.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, any range discussed herein can be readily broken down into a lower third, middle third and upper third, etc.

As will also be understood by one skilled in the art, all ranges described herein, and all language such as "up to", "at least", "greater than", "less than", "more than", "or more", and the like, include the number(s) recited and such terms refer to ranges that can be subsequently broken down into sub-ranges as discussed above.

The invention claimed is:
1. A flow management and separation system for a wellbore having a horizontal section, vertical section and intermediate build section, a production tubing and a primary artificial lift device having an intake and an outlet into the production tubing, the system comprising:

(a) an intake and a central flow passage, to receive produced fluids from the reservoir;

(b) a distal wavebreaker presenting a narrowed annular cross-section, through which the central flow passage passes, and a fluidseeker comprising an axially rotatable inlet extension having a weighted keel inlet in fluid communication with a flow recovery tube, and an internal bypass passage in fluid communication with the central flow passage; and (c) a first slug catcher assembly comprising a perforated shell disposed around the flow recovery tube and connected to the fluidseeker bypass passage, having a perforation configuration, length and volume configured to capture a slug volume and slow its advance; and (d) a sealing sub comprising an internal seal bore extension and a seal bore entry guide, configured to receive a bottom end of a pump intake dip tube, wherein the seal bore extension is connected to the flow recovery tube, the sealing sub defining a bypass passage connected to the first slug catcher;

(e) a second slug catcher comprising a perforated shell disposed around the dip tube and connected at its distal end to the sealing sub bypass; and (f) a pump seating nipple disposed proximally to the second slug catcher, and configured to receive a pump.

2. The system of claim 1, further comprising a second wavebreaker disposed between the first and second slug catchers.

3. The system of claim 1, further comprising a momentum sub comprising a shell having perforations through an upper surface, which perforations are preferably angled in the uphole direction.

4. The system of claim 3, wherein the system comprises a shear sub disposed proximal to the momentum sub.

5. The system of claim 1, wherein one or both slug catchers have define a volume protruding radially inward which is equal to or greater than a slug volume which passes around the slug catcher.

6. The system of claim 1, further comprising a shear sub disposed proximal to the distal wavebreaker.

7. The system of claim 1, further comprising a shear sub disposed proximal to the second slug catcher.

8. The system of claim 1, which is landed in a substantially horizontal portion of the wellbore, inclined slightly toe down.

\* \* \* \* \*

UNITED STATES PATENT AND TRADEMARK OFFICE
CERTIFICATE OF CORRECTION

PATENT NO. : 11,613,982 B2
APPLICATION NO. : 17/129681
DATED : March 28, 2023
INVENTOR(S) : E. Laing et al.

It is certified that error appears in the above-identified patent and that said Letters Patent is hereby corrected as shown below:

In the Claims

Column 14, Line 13 (Claim 5, Line 2) please change "have define a" to -- define a --

Signed and Sealed this
Twenty-second Day of August, 2023

Katherine Kelly Vidal
*Director of the United States Patent and Trademark Office*